3,247,305
MOUNTING ARRANGEMENTS FOR ELECTRIC
FURNACE ELECTRODES
Alec George Allen, Sutton Coldfield, England, assignor to Associated Electrical Industries Limited, London, England, a company of Great Britain
Filed Sept. 16, 1963, Ser. No. 309,055
Claims priority, application Great Britain, Sept. 27, 1962, 36,757/62
4 Claims. (Cl. 13—16)

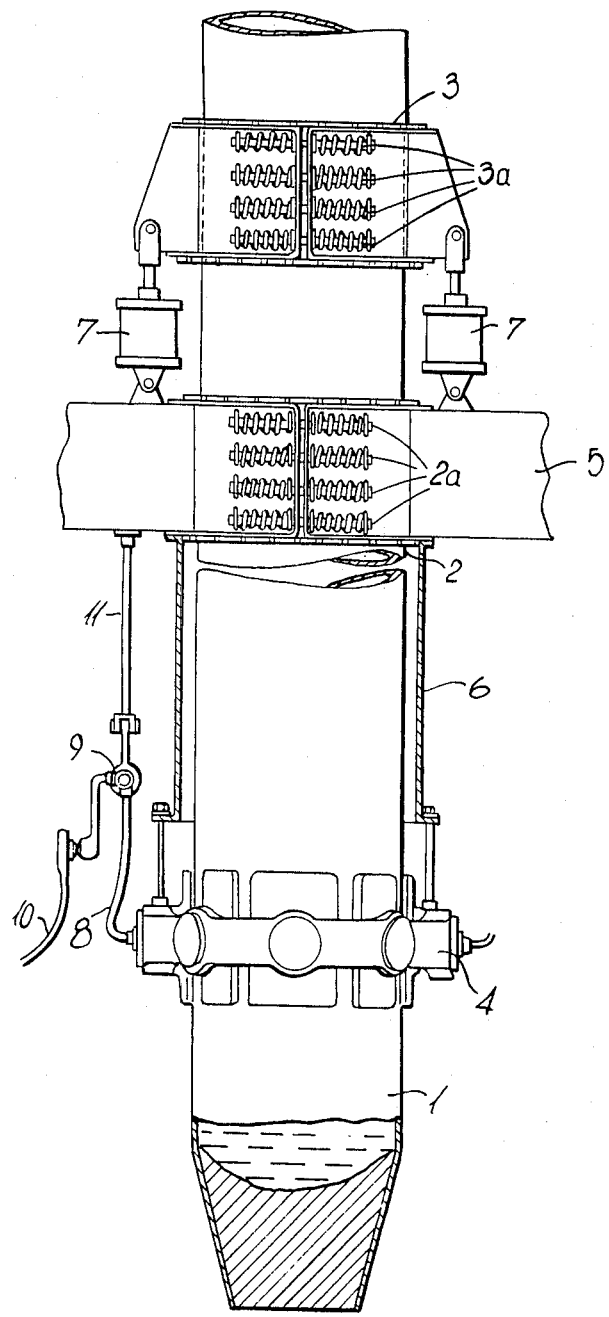

This invention relates to mounting arrangements for electrodes as employed for instance in electric smelting furnaces, and in particular to such arrangement permitting an electrode to be fed towards an arcing region as it is progressively consumed.

In electric smelting furnaces of the submerged arc kind, that is, in which the arc or each of a number of arcs is drawn between electrodes through the material being heated (or between the electrode and the furnace bottom), it is common for each electrode to be mounted vertically in some form of clamping arrangement which is so arranged as to allow controlled lengthwise displacement of the electrode, usually under its own weight, in order to compensate for its consumption.

An object of the present invention is to provide an improved method of effecting controlled electrode displacement in which, in advantageous contrast with methods hitherto proposed, the electrode is positively displaced by a driving action imparted to it by a movable clamp and restoration of this clamp to its starting position can be achieved without releasing the clamping pressure.

In the method according to the present invention the electrode has acting on it in a lengthwise direction a displacing force which may for instance be the force of gravity or the force of a spring. The electrode is gripped by first and second clamping means which respectively apply thereto first and second friction clamping forces of which the clamping force is greater than the difference between the displacing force and the second clamping force but less than their sum and the two clamping forces together are sufficient to hold the electrode against displacement by the displacing force. To displace the electrode lengthwise the first clamping means is simply moved to and fro along said direction with the result, due to the relationship of said forces, that on each movement in the same direction as the displacing force the first clamping means drives the electrode in that direction through the second clamping means whereas on each movement in the reverse direction the first clamping means slips back along the electrode towards its original position ready for the next electrode displacing movement. Consequently, repeated to and fro movement of the movable clamping means will result in progressive lengthwise displacement of the clamped electrode in the last mentioned direction, without requiring release of the clamping means.

In carrying out the invention as applied to a clamping arrangement for a vertically mounted electric smelting furnace electrode, the movable clamping means may comprise a first clamping girdle (or other suitable clamp) which is movable in each direction lengthwise of the electrode relative to a support structure, and the other clamping means may comprise in combination a second clamping girdle (or other suitable clamp) together with contact clamps provided for feeding electric current to the electrode, this second girdle and the contact clamps being carried by the support structure and jointly providing the second clamping friction force. The combined clamping friction force provided jointly by any two of the three clamping elements constituted by the two clamping girdles and the contact clamps, may be made sufficient to hold the electrode against the displacing force (usually its own weight), thereby to permit the remaining clamping element to be released or removed for any purpose, for instance for servicing or replacement, without requiring any other means for supporting the electrode. Alternatively, and preferably, the movable clamping girdle may be itself provide a clamping friction force sufficient to hold the electrode against the displacing force, with the second clamping girdle and the contact clamps providing, as before, a combined clamping friction force sufficient to hold the electrode. In this instance, therefore, not only can any one clamping element be removed for any purpose, but, furthermore, with the second clamping girdle and the contact clamps released, the movable clamping girdle can act to move the electrode against the displacing force. It then becomes possible to retract the electrode away from the furnace in steps by releasing the second girdle and the contact clamps, moving the movable clamping girdle upwards so that it retracts the electrode by the extent of the movement, re-tightening the second girdle and the contact clamps and releasing the movable girdle, moving the movable girdle downwards over the electrode to its original position, re-tightening the movable girdle and then repeating the procedure until the electrode has been retracted as far as required.

In order that the invention may be more fully understood reference will now be made by way of example to the accompanying drawing: the single figure of this drawing illustrates diagrammatically an embodiment of the invention as applied to a vertically mounted electrode for an electric smelting furnace.

Referring to the drawing, an electric smelting furnace electrode 1 is supported in a mounting arrangement comprising two clamping girdles 2, 3, and contact clamps 4 by which electric current is conducted to the electrode 1. Each of the two girdles 2, 3 is an axially split metal cylinder which circumferentially grips the electrode 1 with a friction force that can be varied by means of loading springs, 2a or 3a, which act across the gap in the split cylinder. Such clamping girdles apply a uniform pressure around the electrode 1 and are therefore eminently suited for use with electrodes of the consumable self-baking type comprising a metal casing containing carbon or graphite paste, because they permit a high value of pressure to be applied to the electrode casing above the paste level without danger of collapsing the casing. In fact, within certain limits such clamping girdles actually tend to constrain the electrode casing to its circular shape.

The clamping girdle 2 is carried by a support platform 5 as is also a cooling mantle 6 for the electrode 1. This cooling mantle 6 supports the contact clamps 4, to each clamp of which an electrical connection such as connection 8 is made from a ring main feeder 8 connected through flexible cabling 10 to busbars (not shown). Insulated supports such as support 11 depending from the platform 5 support the ring main feeder 9 and the electrical connections to the clamps. The girdle 2 and contact clamps 4 are fixed in position whereas the girdle 3 is movable relatively to the support platform 5 by means of motivating devices 7 which may be fluid-pressure cylinders, power-driven screws, or any other means suitable for imparting downwards and upwards movement to the girdle 3 relative to the support platform 5.

In conformity with the invention, the spring-loading of the two clamping girdles 2, 3 may be adjusted so that the clamping friction forces respectively applied by them will jointly support the weight of the electrode 1 and are preferably substantially equal, but that neither friction force will support the weight alone, with the contact clamps 4 adjusted (in any suitable manner according to their design) so as to exert on the electrode 1 a clamping friction force which is any value less than that of the displacing force afforded by the weight of the electrode, but which is preferably of such value so as jointly with the friction force of either of the clamping girdles 2, 3 to support the weight of the electrode 1. For example, each of these three friction forces may be such as to support just over half the weight of the electrode 1. This has the advantage of allowing the contact clamps 4 or either of the clamping girdles 2 and 3 to be slackened or removed, for instance for servicing, without the need for employing any other means for supporting the electrode.

With clamping friction forces adjusted as above, downward movement of the girdle 3 by means of the devices 7 will cause this girdle to exert on the electrode 1 a downward force of up to its frictional force. Since this downward force represents just over half the weight of the electrode 1 and is therefore greater than the difference between the weight of the electrode and the combined friction forces applied by the girdle 2 and contact clamps 4, the combined downward force now obtaining overcomes the friction force applied by the girdle 2 and contact clamps 4 so that the electrode 1 is driven downwards for a distance corresponding to the downward travel of the girdle 3. On the girdle 3 being moved upwards by the devices 7 its clamping friction force is insufficient to lift the electrode 1 through the girdle 2 and contact clamps 4, being less than the sum of their friction forces and the electrode weight, so that the girdle 3 slides along the electrode back to its original position. Repetition of these actions by causing the device 7 to impart a reciprocating movement to the girdle 3 will therefore cause the electrode 1 to be moved progressively downwards without the need for releasing either of the clamping girdles 2 and 3 or the contact clamps 4. The girdles 2 and 3 adjusted to provide friction forces as aforesaid will support and progress downwards the electrode 1 even if the contact clamps 4 are completely released, this being a desirable feature if and when there is a tendency for the electrode 1 to stick in the contact clamps 4.

By increasing the clamping friction force of the girdle 3 so that this girdle can by itself support the electrode 1, but cannot lift the electrode against the friction force applied thereto by the other girdle 2 and/or the contact clamps 4, the mounting arrangement will function exactly as just described, but additionally it can serve to retract the electrode 1 upwards when required. To accomplish this the girdle 2 and the contact clamps 4 are released so that when the girdle 3 moves upwards it takes the electrode 1 with it. The girdle 2 and contact clamp 4 are then re-tightened and the moving girdle 3 released and moved downwards over the electrode 1 to its original position and then re-tightened, these operations being subsequently repeated until the electrode 1 has been lifted as far as required.

The reciprocating motion of the clamping girdle 3 can be quite random as to time interval, for example, it can be imparted by manually initiating, when required, the operation of the devices 7.

What I claim is:

1. A method of effecting controlled lengthwise displacement of an electrode having a displacing force acting on it in one lengthwise direction, comprising the steps of gripping the electrode by first and second clamping means which respectively apply thereto first and second friction clamping forces of which the first clamping force is greater than the difference between the displacing force and the second clamping force but less than their sum and the two clamping forces together are sufficient to hold the electrode against displacement by the displacing force, and moving said first clamping means to and fro along said direction with the result, due to the relationship of said forces, that on each movement in the same direction as the displacing force the first clamping means drives the electrode in that direction through the second clamping means whereas on each movement in the reverse direction the first clamping means slips back along the electrode.

2. A method of electrode displacement as claimed in claim 1 in which the friction force applied by such said clamping means is individually greater than the displacing force but less than the sum of the displacing force and the other friction force, whereby each of these friction forces itself is able to hold the electrode against the displacing force.

3. A method of electrode displacement as claimed in claim 1, including the step of applying said second friction force by means of a fixed clamping girdle and fixed contact clamps together constituting said second clamping means.

4. A method of electrode displacement as claimed in claim 3 in which the combined clamping friction force applied jointly by any two of the three clamping elements constituted by the first clamping means, the fixed clamping girdle and the contact clamps is sufficient to hold the electrode against the displacing force.

References Cited by the Examiner
UNITED STATES PATENTS

| | | | |
|---|---|---|---|
| 2,778,865 | 1/1957 | Kongsgaarden | 13—16 |
| 2,896,003 | 7/1959 | Eaton | 13—14 |
| 2,903,494 | 9/1959 | Meffert | 13—14 |
| 3,107,267 | 10/1963 | Blackmore | 13—14 X |

RICHARD M. WOOD, *Primary Examiner.*
JOSEPH V. TRUHE, *Examiner.*